United States Patent Office 2,920,976
Patented Jan. 12, 1960

2,920,976
TREATMENT OF ACIDIC CARBON BLACKS

Adolf Damusis, Cleveland, Ohio, assignor to The Sherwin-Williams Company, Cleveland, Ohio, a corporation of Ohio No Drawing. Application February 24, 1953
Serial No. 338,622

17 Claims. (Cl. 106—307)

This invention relates as indicated to treated carbon blacks and more specifically to acidic carbon blacks that have been treated with salts of heavy metals and weak organic acids. The paint, ink and rubber industries make considerable use of carbon blacks and specially developed properties of the carbon blacks are very useful in improving their performance in paints, ink and rubber. The color intensity and tint, the structure and electrical conductivity, the surface acidity and amount of volatile matter, the fineness and adsorptive capacity of particles of carbon blacks are all properties of carbon blacks which affect the tone, flow, viscosity, tack, drying time, flooding and floating of inks, paints and lacquers, and also affect the heat build-up, reinforcing ability and hardness of vulcanized rubber stocks.

The term "carbon pigments" or "carbon blacks," as used herein, will be understood to include the wide groups of black pigments which include channel impingement blacks, furnace blacks of thermal and combustion type, and all the lamp blacks.

Acidic and neutral carbon blacks, in general, may be characterized by:

(1) Surface polarity due to carboxyl groups present on the surface of the carbon black particle, which is a typical property of the acidic channel carbon blacks and of the acidic lamp blacks; and (2) Internal spatial polarizability depending on the constitution of carbon black macro-molecule which is typical of the finest furnace blacks and acetylene blacks and results in a high structure forming tendency and high electrical conductivity.

Surface polarity of carbon black seems to be an essential factor in its adsorptive power for gas or other small molecules, or of the small active groups of the surrounding medium, such as hydroxyls, carboxyls, and metal cations such as are present in driers. High surface polarity also causes difficulty in obtaining complete dispersion throughout paints.

This invention concerns itself with the channel impingement blacks and all true acidic lamp blacks which are classifiable under group 1 above. Acidic carbon blacks of highly developed surface polarity, hydrophilic in character, contain a high amount of volatile matter, and are highly adsorptive. The large number of carboxyl groups in the structure of carbon black macromolecules produces a highly acidic character, which in respect to the ionization constant in a very concentrated sludge is only slightly weaker than 0.1 N acetic acid. Acidic carbon blacks or carbon pigments as used in paints adsorb moisture from the air, also adsorb carbon dioxide, react with accelerators, decompose the driers used and cause flooding and floating. When carbon blacks react with the driers used in paint compositions, there is a replacement of the heavy metal cation and a release of the free acid residue of the drier. The presence of free acid in the paint composition together with the decomposed drier leads to greatly increased drying times due to depletion of the drier and the oxidation inhibition characteristics of free acids. Floating and flooding also results, producing a spotty, streaked, and non-uniform final color. Acidic carbon blacks exhibit varying degrees of flooding and floating. When first produced, these blacks cause a black flooding, and after aging, there is a non-flooding stage followed later by a white flooding stage.

Because of the fact that the acidic carbon blacks used in industry today adsorb moisture from the surroundings, they must be handled in special waterproof bags or containers, thereby adding to the cost of the material.

Acidic carbon blacks as used in the rubber industry impart to the rubber stock such highly desirable characteristics as high tensile strength and resistance to tear and abrasion. Unfortunately, since most channel or acidic blacks are very fine in particle size, they are dispersed throughout the rubber compound only after considerable difficulty and a high heat build-up. These difficulties necessitate special processing techniques. Likewise, these same acidic carbon blacks have a pronounced tendency to adsorb the accelerators used in rubber compounding, such as diphenylguanidine and other organic accelerating compounds. Since accelerators are adsorbed by the blacks, more must be used to keep the curing times within reasonable limits.

It is believed that the detrimental effects of carbon black pigments are principally limited to acidic carbon blacks, as most neutral carbon blacks do not usually possess any of these unfavorable characteristics. Therefore, much research and experimentation has gone into the improvement of acidic carbon blacks or carbon pigments.

Attempts have been made to improve the characteristics of acidic carbon blacks by the heating in an air-restricted atmosphere. These have resulted in a de-activated or de-volatilized carbon black in which the carboxyl groups are no longer present but the carbon blacks so treated now have new properties which give rise to entirely different reactions in paint. Neutralization with alkalies has also been tried. However, the resulting product is too easily hydrolyzed, adsorbs carbon dioxide and moisture, and decomposes driers with the subsequent formation of free acids. The presence of free acids results in a longer drying time. It is believed that the metallic cations of the driers combine with the macromolecule of the carbon black with the resultant formation of free acid.

Treating acidic carbon black with alkali salts of organic acids has also been tried. Here again the results are much the same as those obtained by neutralization with alkali, in that the alkali metals are easily replaced by the heavy metals of the drier.

Therefore, it is a principal object of this invention to provide a new type of carbon black and method for producing the same comprising making acidic carbon blacks substantialy inert to the driers and accelerators normally used in paint manufacture, e.g., lead, manganese, cobalt, etc., naphthenates, tallates, oleates, stearates, octoates, etc.

Another object of this invention is to provide a novel carbon black and method for producing the same which comprises making acidic carbon blacks substantially inert to the accelerators and like compounds used in rubber manufacture, such as, diphenyl guanidine, etc.

Another object of this invention is to provide an improved carbon black, which when used as a carbon filler in rubber compounds does not substantially affect the normal curing time and is easily dispersed within the rubber stock with low heat build-up.

Still another object of this invention is to provide a method of treatment of acidic carbon blacks whereby the tendency of such carbon blacks when used in paints, inks and rubber compositions to adsorb moisture from the atmosphere is substantially inhibited, with the result that such treated blacks may then be put up in the usual cheap containers.

Still another object of this invention is to provide a carbon black, which when used as a carbon pigment in paints, does not substantially affect the normal drying time and has improved anti-flooding and anti-floating properties.

Another object of this invention is to provide an improved type carbon black which possesses none of the detrimental characteristics while retaining substantially all of the beneficial characteristics of acidic carbon blacks.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that treatment of acidic carbon blacks with salts of heavy metals and weak organic acids and subsequently washing with a solvent in which the free acid formed is soluble yields a carbon black that has all of the above desired characteristics.

Broadly stated then, this invention provides a novel carbon black and the method of producing the same which comprises conditioning an acidic carbon black comprising intimately contacting a finely divided carbon black having a pH of no more than about 6 with a solution of a salt of a heavy metal and an aliphatic carboxylic acid and washing the product with a solvent in which the free acid formed is soluble.

More particularly stated, this invention comprises the method of conditioning an acidic carbon black comprising intimately contacting a finely divided carbon black having a maximum pH of about 6 with a 5% to 30% solution of a salt of a heavy metal and an aliphatic carboxylic acid in a solvent for said salt, the amount of said solution being such as to provide heavy metal in the amount of 15% to 20% by weight of the weight of the carbon black being treated, said aliphatic carboxylic acid containing from 2 to 24 carbon atoms, and washing the product with a solvent in which the free acid formed is soluble.

The carbon blacks that are to be treated by the method of this invention are all channel blacks and acidic lamp blacks. These carbon blacks have a maximum pH of about 6; the most frequently encountered carbon blacks being those having an original pH of 2.8 to 3.3. Examples of these blacks are Columbian "Neo-Spectra 2," Cabot's "Carbolac," and Continental's "Kosmos F-4" and other channel blacks that are high, medium and low in color, hard and medium in processing and electrically conductive.

The heavy metal cations of the soaps or salts herein employed are, for example, lead, manganese, cobalt, copper and zinc. Examples of the aliphatic carboxylic acids that may be employed to provide the acid radical in these salts are those having from 2 to 24 carbon atoms, either water-soluble or water-insoluble. Examples of the water-insoluble aliphatic carboxylic acids which may be used are stearic, naphthenic, oleic, linoleic and tall oil acids. Examples of the water-soluble acids are isobutyric, propionic, valeric, trimethyl acetic, and other such weak water-soluble organic carboxylic acids. The preferred salts are basic heavy metal naphthenates or basic heavy metal trimethyl acetates. It might be mentioned at this point that any aliphatic carboxylic acid may be used that is weaker in acidity than that of the carbon black to be treated.

The solvents useful in the washing step of this invention are those in common use in the paint industry. Examples are thinners, mineral spirits, toluene, xylene, etc. The above mentioned solvents are useful when salts are used that are water-insoluble. When water-soluble salts are used, the washing step may be performed by using water. In this connection it may be mentioned that solvents that are capable of dissolving both the water-soluble and water-insoluble salts such a the alcohols, might be used, either alone or in combination with other solvents, e.g., water-alcohol, toluene-alcohol, etc.

Following are examples of detailed preparation of the novel carbon black products, and it will be understood that this invention is not limited to the specific conditions described nor to the specific materials used in the examples:

*Example I*

1,000 grams of a high color channel black, having a pH of 2.8 to 3.3 and a volatile matter content of between 14 to 17%, were agitated with 1430 milliliters of a 24% solution of lead naphthenate in mineral spirits. The amount of lead naphthenate used is calculated on the heavy metal ion being from 15 to about 20% of the weight of the carbon black. About 7,000 milliliters of mineral spirits were added to reduce the sludge to a consistency that was workable. The sludge was agitated for approximately 2 to 3 hours and then filtered. After filtering, the free organic acid formed by the reaction was washed from the sludge with additional mineral spirits. The presscake of treated carbon black that results from the process may then be dried out and used in the form of beads or may be used as a paste. In this example, about 50% to 60% of the acidic hydrogen of the carbon black had been replaced by the heavy metal, lead.

*Example II*

1,000 grams of a high color channel black having a pH of about 2.8 to 3.3 and a volatile matter content of approximately 14 to 17% were agitated with 1890 milliliters of a 6% solution of manganese tallate in 6630 milliliters of mineral spirits. The sludge was agitated for approximately 3 to 4 hours at slightly elevated temperatures. After agitation, the sludge was filtered and washed with additional mineral spirits until substantially all of the free tall oil acids were removed. The presscake that was obtained could be dried or used as a paste. The pH of the treated carbon black was approximately 6 to 6.8 and had approximately 70% to 85% of its acidic hydrogen replaced by the heavy metal, manganese.

*Example III*

1,000 grams of a medium color channel black having a pH of about 3.0 to 5.0 and a volatile matter content of from 7 to 11% was agitated for 2 to 3 hours with a 24% solution of lead naphthenate in 3850 milliliters of mineral spirits. If the temperature of the sludge is elevated slightly during agitation, equilibrium may be achieved in a shorter period. The sludge was then filtered, washed with additional mineral spirits and used as a paste or dried to the form of little beads. The acidic hydrogen of the carbon black was replaced by the heavy metal lead by approximately 50% to 60%.

*Example IV*

1,000 grams of an acidic lamp black, having a pH of about 2.9 to 4.0 and a volatile matter content of about 5 to 8%, were agitated with 1570 milliliters of about a 6.8% solution of manganese linoleate in 2630 milliliters of mineral spirits for a period of time of about 3 to 4 hours at slightly elevated temperatures. The sludge was then filtered and washed with additional mineral spirits. The treated material may be further dried to the form of little beads or used as a paste. The treated black had approximately 70% to 85% of its acidic hydrogen replaced by the heavy metal, manganese.

Example V 1,000 grams of a high color channel carbon black, having a pH of about 2.8 to 3.3 and a volatile matter content of approximately 14 to 17%, were agitated with 1800 milliliters of a 20% cobaltous propionate water solution in 7000 milliliters of water for approximately 2 to 3 hours. After agitation, the sludge was filtered and the free organic acid formed was removed by washing with water. The presscake that was obtained could be dried out and used in the form of beads or employed as a paste. The treated black had approximately 50% to 60% of its acidic hydrogen replaced by the heavy metal, cobalt.

Example VI 1,000 grams of a medium color channel carbon black having a pH of about 3.0 to 5.0 and having a volatile matter content of 7 to 11% was agitated for 2 to 3 hours with 5,000 grams of an 8% lead isobutyrate water solution. The sludge was then filtered and washed with water. The presscake may be used as a paste or dried to the form of little beads. The treated black had approximately 50% to 60% of its acidic hydrogen replaced by the heavy metal, lead.

Example VII 1,000 grams of an acidic lamp black, having a pH of about 2.9 to 4.0 and having a volatile matter content of approximately 5 to 8%, were agitated with 750 milliliters of a 12% manganese valerate water solution in 4000 milliliters of water. The agitation was carried out at elevated temperatures for approximately 2 to 3 hours. The slightly elevated temperatures are employed because of the increased solubility of manganese valerate in hot water. After agitation the sludge was filtered and the liberated fatty acids removed by washing with additional water and again filtered. The presscake may be used as such or may be dried to the form of little beads. The treated black had approximately 50% to 60% of its acidic hydrogen replaced by the heavy metal, manganese.

The relative ease of acidic hydrogen replacement in some of the cases may be a function of the strength of the acid used in the manufacture of the salt employed or the method of manufacture of the carbon black itself or a combination of both. It has been found, however, that repetition of the procedure results in a higher degree of replacement in those cases where the conversion was initially of from 50% to 60%. This is not to be construed as saying the carbon blacks which have been improved to the extent of replacing only 50% to 60% of acidic hydrogen are not useful, as the contrary has been found to be true. In general, the replacement of 40% to 90% of acidic hydrogen results in improvement in the properties of the treated carbon blacks in respect of the desired properties above referred to.

When carbon blacks are treated with salts of bivalent or polyvalent metals, they combine by a simple bond with the carbon black, liberating one molecule of the organic acid. The reaction may be represented as follows:

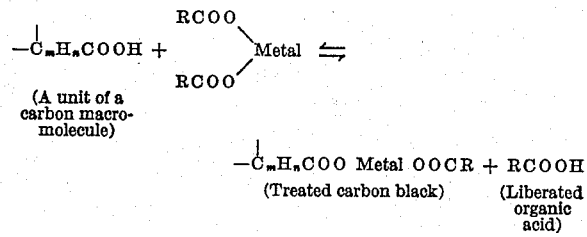

(A unit of a carbon macro-molecule)

$-C_mH_nCOO$ Metal $OOCR + RCOOH$
(Treated carbon black)  (Liberated organic acid)

The end point of the particular reaction or method taught by this invention is reached when the maximum amount of free acid is obtained. This may be found by titration, or pH determination.

Thus it can be seen that the mere treatment of carbon black with a salt of a heavy metal and an aliphatic carboxylic acid alone is not sufficient. It is essential to the successful practice of this invention to perform the washing step whereby the free acid liberated is removed from the slurry. Experience has shown that should the free acid be allowed to remain in intimate contact with the finely divided carbon black particles, no improvement in drying of a normally compounded paint will be observed with such incompletely processed carbon black pigment. The free acid liberated must be substantially entirely removed from the carbon black particles. Thereafter, the pigment may be filtered and used as a presscake, and, if desired, further dried and used as a dry pigment in the usual manner. Such initially acidic carbon blacks are now substantially devoid of the characteristics which have heretofore made them unsuited for use in certain paint and rubber formulations.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of conditioning an acidic carbon black comprising intimately contacting a finely divided carbon black having a maximum pH of about 6 with a solution of a salt of a heavy metal and an aliphatic carboxylic acid and washing the product with a solvent in which the free acid formed is soluble.

2. A method of conditioning an acidic carbon black comprising a finely divided carbon black having a maximum pH of about 6 with a solution of a salt of a heavy metal and an aliphatic carboxylic acid, said aliphatic carboxylic acid having from 2 to 24 carbon atoms and washing the product with a solvent in which the free acid formed is soluble.

3. The method of conditioning an acidic carbon black comprising intimately contacting a finely divided carbon black having a maximum pH of about 6 with a solution of a salt of a heavy metal and an aliphatic carboxylic acid in a solvent for said salt, said aliphatic carboxylic acid having from 2 to 24 carbon atoms, and washing the product with a solvent in which the free acid formed is soluble.

4. The method of conditioning an acidic carbon black comprising intimately contacting a finely divided carbon black having a maximum pH of about 6 with a 5% to 30% solution of a salt of a heavy metal and an aliphatic carboxylic acid in a solvent for said salt, the amount of said solution being such as to provide heavy metal in the amount of 15% to 20% by weight of the weight of the carbon black being treated, said aliphatic carboxylic acid containing from 2 to 24 carbon atoms, and washing the product with a solvent in which the free acid formed is soluble.

5. The method of claim 1 in which the carbon black is a channel black.

6. The method of claim 1 in which the carbon black is an acidic lamp black.

7. The method of claim 1 in which the heavy metal is lead.

8. The method of claim 1 in which the salt is lead naphthenate.

9. The method of claim 1 in which the salt is lead trimethyl acetate.

10. The method of claim 1 in which the heavy metal is cobalt.

11. The method of claim 1 in which the heavy metal is manganese.

12. The method of claim 1 in which the aliphatic carboxylic acid is water-soluble.

13. The method of claim 1 in which the aliphatic carboxylic acid is water-insoluble.

14. The method of claim 1 in which the aliphatic carboxylic acid is naphthenic acid.

15. The method of claim 1 in which the aliphatic carboxylic acid is trimethyl acetic acid.

16. The method of claim 4 in which the solvent is water.

17. The method of claim 4 in which the solvent is mineral spirits.

References Cited in the file of this patent

UNITED STATES PATENTS

| | | |
|---|---|---|
| 1,999,541 | Keller | Apr. 30, 1935 |
| 2,062,159 | Brizzolara et al. | Nov. 24, 1936 |
| 2,178,382 | Wiegand | Oct. 31, 1939 |
| 2,201,050 | Oberle | May 14, 1940 |
| 2,210,763 | King | Aug. 6, 1940 |
| 2,236,296 | Minich et al. | Mar. 25, 1941 |
| 2,331,199 | King | Oct. 5, 1943 |
| 2,427,238 | Swart | Sept. 9, 1947 |
| 2,455,898 | Ness | Dec. 7, 1948 |
| 2,635,037 | Jordan | Apr. 14, 1953 |
| 2,676,873 | Cines et al. | Apr. 27, 1954 |

FOREIGN PATENTS

| | | |
|---|---|---|
| 366,973 | Great Britain | Feb. 8, 1932 |

OTHER REFERENCES

Pages 75 and 92, kerosene and naphthenic acid respectively of the "National Paint Dictionary," 2nd ed., by Jeffery R. Stewart (1942).

Page 163 of Fieser and Fiesers "Organic Chemistry," 2nd ed., 1950, published by D. C. Heath & Co. of Boston, Mass.

Page 495 of vol. II of Mattiello's "Protective and Decorative Coatings" (1942).

Circular No. 321 of the American Paint and Varnish Manufacturers Association entitled "Facets Effects of Pigments," by Henry Gardner, January 1928.

Article on "Dispersion of Channel Gas Black in Rubber" on pages 582–586 of the "Industrial and Engineering Chemistry," publication May 1935, vol. 27.

Braendle et al.: "India Rubber World," vol. 119, No. 1, October 1948, pages 57–62.

UNITED STATES PATENT OFFICE

CERTIFICATE OF CORRECTION

Patent No. 2,920,976                  January 12, 1960

Adolf Damusis

It is hereby certified that error appears in the above numbered patent requiring correction and that the said Letters Patent should read as corrected below.

Column 3, line 56, for "Continental's "Kosmos F-4"" read --- United Carbon Company's "Kosmos F-4" ---.

Signed and sealed this 26th day of May 1964.

(SEAL)
Attest:

ERNEST W. SWIDER
Attesting Officer

EDWARD J. BRENNER
Commissioner of Patents